US012606576B2

(12) United States Patent
Kawakami et al.

(10) Patent No.: US 12,606,576 B2
(45) Date of Patent: Apr. 21, 2026

(54) METHOD FOR PRODUCING NITROGEN-CONTAINING ORGANOXYSILANE COMPOUND

(71) Applicant: Shin-Etsu Chemical Co., Ltd., Tokyo (JP)

(72) Inventors: Masato Kawakami, Joetsu (JP); Yoichi Tonomura, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/527,314

(22) Filed: Nov. 16, 2021

(65) Prior Publication Data

US 2022/0169665 A1 Jun. 2, 2022

(30) Foreign Application Priority Data

Nov. 30, 2020 (JP) ................................. 2020-197919

(51) Int. Cl.
*C07F 7/18* (2006.01)

(52) U.S. Cl.
CPC .................................. *C07F 7/1892* (2013.01)

(58) Field of Classification Search
None
See application file for complete search history.

(56) References Cited

U.S. PATENT DOCUMENTS 4,481,364 A * 11/1984 Chu ...................... C07F 7/1876 556/413
4,526,996 A * 7/1985 Kilgour ................. C07F 7/1892 556/424
5,300,641 A * 4/1994 Dinh ....................... C07F 7/083 556/424
10,899,779 B2 * 1/2021 Hirokami .............. C07F 7/1892
12,240,868 B2 * 3/2025 Yamada ................ C07F 7/1872
2015/0249012 A1 * 9/2015 Kanno ................. C09D 183/06 524/588
2020/0216477 A1 * 7/2020 Hirokami .............. C07F 7/1892

FOREIGN PATENT DOCUMENTS

EP 3 783 003 A1 2/2021
JP 2009143881 A * 7/2009
JP 2018-70488 A 5/2018
JP 2018070488 A * 5/2018
JP 2019-182787 A 10/2019
WO WO 2019/202795 A1 10/2019
WO WO 2020/070984 A1 4/2020

OTHER PUBLICATIONS https://www.chembk.com/en/chem/Diazabicycloundecene, downloaded Mar. 9, 2023.*
N.G. Anderson, Practical Process & Research Development 203-267, (2000) (Year: 2000).*
Extended European Search Report for European Application No. 21210690.0, dated Apr. 5, 2022.

* cited by examiner

*Primary Examiner* — Alexander R Pagano
(74) *Attorney, Agent, or Firm* — Birch, Stewart, Kolasch & Birch, LLP

(57) ABSTRACT

A method for producing a compound (3), (3)

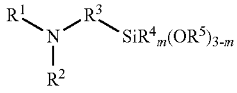

by reacting a compound (1)

(1)

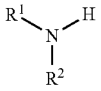

having $R^1$ and $R^2$ representing a hydrogen atom or a monovalent hydrocarbon group wherein a case where both $R^1$ and $R^2$ are a hydrogen atom is excluded,
with a compound (2)

(2)

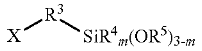

having $R^3$ representing a divalent hydrocarbon group, $R^4$ and $R^5$ representing a monovalent hydrocarbon group, X representing a halogen atom, and m representing an integer of 0 to 2
the method comprising the steps of:
using 0.1 mol or more and less than 1 mol of a compound (4)

(4)

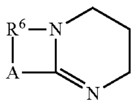

having $R^6$ representing a divalent hydrocarbon group and A representing a single bond or the like per 1 mol of the halogen atom in the compound (2), and
liquefying a mixture of hydrogen halide salts of the compounds (1) and (4) generated as a by-product to separate the mixture from the compound (3) and removing the mixture.

4 Claims, No Drawings

METHOD FOR PRODUCING NITROGEN-CONTAINING ORGANOXYSILANE COMPOUND

CROSS-REFERENCE TO RELATED APPLICATION

This non-provisional application claims priority under 35 U.S.C. § 119(a) on Patent Application No. 2020-197919 filed in Japan on Nov. 30, 2020, the entire contents of which are hereby incorporated by reference.

TECHNICAL FIELD

The present invention relates to a method for producing a nitrogen-containing organoxysilane compound.

BACKGROUND ART

Nitrogen-containing organoxysilane compounds are useful as an agent such as a silane coupling agent, a surface treatment agent, a resin additive agent, a paint additive agent, or an adhesive agent.

Examples of the compound known as such a nitrogen-containing organoxysilane compound include organoxysilane compounds, such as aminopropyltrimethoxysilane, having a primary amino group, organoxysilane compounds, such as N-phenylaminopropyltrimethoxysilane, having a secondary amino group, and organoxysilane compounds, such as dimethylaminopropyltrimethoxysilane, having a tertiary amino group.

Nitrogen-containing organoxysilane compounds are generally produced by a reaction between an amine compound and a haloalkyl organoxysilane compound. At this time, a hydrogen halide salt of the amine compound used as a raw material is generated as a by-product. In many cases, this hydrogen halide salt is solid. Therefore, in order to isolate the target nitrogen-containing organoxysilane compound, the hydrogen halide salt of the amine compound is to be removed. Examples of the method of removing the hydrogen halide salt include a filtration method and a method in which the hydrogen halide salt is dissolved in water and the solution is separated and removed.

However, in the case of the method in which the hydrogen halide salt is separated by filtration, the nitrogen-containing organoxysilane compound as a target product is adsorbed to the hydrogen halide salt of the amine compound, and therefore, the target product cannot be obtained in good yield unless the residue is repeatedly washed with a solvent, so that the step is complicated.

In the case of the method in which the hydrogen halide salt is dissolved in water and the solution is separated and removed, a washing step as described above is not included, so that the step can be simplified. However, the target nitrogen-containing organoxysilane compound has a hydrolyzable silyl group in the molecule, and is easily hydrolyzed when brought into contact with water. Therefore, in the method in which the hydrogen halide salt of the amine compound is dissolved in water and the solution is separated and removed, the target nitrogen-containing organoxysilane compound cannot be obtained in good yield.

In order to solve the above-described problems, a method has been reported in which a hydrogen halide salt of an amine compound is liquefied without using water and separated. Various methods have been proposed in which a layer including a target nitrogen-containing organoxysilane compound and a layer including a liquefied hydrogen halide salt are separated, and the liquefied hydrogen halide salt is separated and removed.

For example, Patent Document 1 describes a method in which an amine compound and a haloalkyl organoxysilane compound in the presence of an aprotic polar solvent are reacted in the presence of a tertiary amine compound such as 1,8-diazabicyclo[5.4.0]undeca-7-ene (hereinafter, also referred to as "DBU") to produce a nitrogen-containing organoxysilane compound. DBU is more basic than the amine compound as a raw material, and therefore, the generated hydrogen halide forms a hydrogen halide salt with DBU.

Patent Document 2 describes a method in which a nitrogen-containing organoxysilane compound having an NH structure and a chlorosilane compound having an Si—Cl structure are reacted in the presence of acetonitrile and a tertiary amine such as DBU to convert the NH structure into an N—Si structure. Also in this reaction, DBU is more basic than the nitrogen-containing organoxysilane compound as a raw material, and therefore, the generated hydrogen halide forms a hydrogen halide salt with DBU. Patent Document 2 also describes that the hydrogen halide salt of DBU generated in this reaction is dissolved in acetonitrile, and the solution can be separated and removed.

CITATION LIST

Patent Document 1: JP-A 2019-182787
Patent Document 2: JP-A 2018-070488

SUMMARY OF THE INVENTION

However, in the methods described in Patent Documents 1 and 2, excessive DBU is used with respect to the chlorosilane compound or the haloalkyl organoxysilane compound, and therefore, DBU remains in addition to the product, so that there is a problem that the target product is difficult to isolate and purify and has a low purity.

The present invention has been made in view of the above-described circumstances, and provides a method for producing a nitrogen-containing organoxysilane compound. In the method, a solution of a hydrogen halide salt can be separated and removed, a base for the separation and removal is not to be used excessively with respect to a haloalkyl organoxysilane compound, and the nitrogen-containing organoxysilane compound is easily isolated and purified.

As a result of intensive studies to achieve the above-described object, the present inventors have found that in a reaction between an amine compound and a haloalkyl organoxysilane compound, use of a predetermined amount of a specific nitrogen-containing compound facilitates removal of the amine hydrogen halide salt as a by-product to obtain a target product having a good purity, and thus completed the present invention.

That is, the present invention provides 1. a method for producing a nitrogen-containing organoxysilane compound having a general formula (3) described below:

(3)

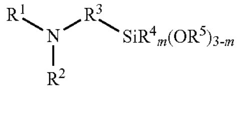

wherein $R^1$ and $R^2$ each independently represent a hydrogen atom or a monovalent hydrocarbon group having 1 to 10 carbon atoms, the monovalent hydrocarbon group may include an oxygen, nitrogen, sulfur, or silicon atom in some cases, $R^1$ and $R^2$ may be bonded to each other to form a ring together with a nitrogen atom in some cases, and a case where both $R^1$ and $R^2$ are a hydrogen atom is excluded, $R^3$ represents an unsubstituted divalent hydrocarbon group having 1 to 8 carbon atoms, $R^4$ and $R^5$ represent an unsubstituted monovalent hydrocarbon group having 1 to 6 carbon atoms, and m is an integer of 0, 1, or 2, by reacting an amine compound having a general formula (1) described below:

(1)

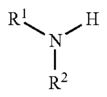

wherein $R^1$ and $R^2$ are as described above, with a haloalkyl organoxysilane compound having a general formula (2) described below:

(2)

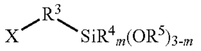

wherein $R^3$ to $R^5$ and m are as described above, and X represents a halogen atom selected from the group consisting of a chlorine atom, a bromine atom, and an iodine atom, the method comprising the steps of:

using 0.1 mol or more and less than 1 mol of a nitrogen-containing compound having a general formula (4) described below per 1 mol of the halogen atom in the haloalkyl organoxysilane compound having a general formula (2):

(4)

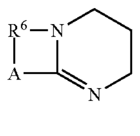

wherein $R^6$ represents an unsubstituted divalent hydrocarbon group having 2 to 5 carbon atoms, and A represents a single bond, —NH—, or —$NCH_3$—, and liquefying, in presence of a solvent, a mixture of the hydrogen halide salt of the amine compound having the general formula (1) and the hydrogen halide salt of the nitrogen-containing compound having the general formula (4) that are generated in the reaction system to separate the mixture from the nitrogen-containing organoxysilane compound having a general formula (3) and removing the mixture, 2. the method for producing a nitrogen-containing organoxysilane compound according to the item 1, wherein the solvent is a protic polar solvent,
3. the method for producing a nitrogen-containing organoxysilane compound according to the item 2, wherein the protic polar solvent is an alcohol compound,
4. the method for producing a nitrogen-containing organoxysilane compound according to any one of the items 1 to 3, wherein 1.4 mol or more of the amine compound having the general formula (1) is used per 1 mol of the halogen atom in the haloalkyl organoxysilane compound having the general formula (2),
5. the method for producing a nitrogen-containing organoxysilane compound according to any one of the items 1 to 4, wherein 0.6 mol or more and less than 1 mol of the nitrogen-containing compound having the general formula (4) is used per 1 mol of the halogen atom in the haloalkyl organoxysilane compound having the general formula (2), and
6. the method for producing a nitrogen-containing organoxysilane compound according to any one of the items 1 to 5, wherein the nitrogen-containing compound having the general formula (4) is 1,8-diazabicyclo[5.4.0]undeca-7-ene or 1,5-diazabicyclo[4.3.0]nona-5-ene.

ADVANTAGEOUS EFFECTS OF THE INVENTION

In the method for producing a nitrogen-containing organoxysilane compound of the present invention, a layer including a target product and a layer including hydrogen halide salts are separated, and thus the hydrogen halide salt, generated by the reaction, of the amine compound can be efficiently removed.

The reaction solution is free of a remaining chemical substance used for separation in the reaction system, and therefore a desired nitrogen-containing organoxysilane compound can be easily isolated and purified.

DESCRIPTION OF THE PREFERRED EMBODIMENT

Hereinafter, the present invention is specifically described.

The method for producing a nitrogen-containing organoxysilane compound having the following general formula (3):

(3)

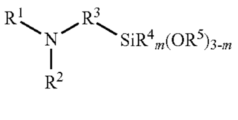

(hereinafter, referred to as "nitrogen-containing organoxysilane compound (3)") of the present invention by reacting an amine compound having the following general formula (1)

(1)

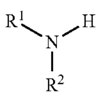

(hereinafter, referred to as "amine compound (1)") with a haloalkyl organoxysilane compound having the following general formula (2):

(2)

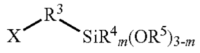

(hereinafter, referred to as "haloalkyl organoxysilane compound (2)") includes the steps of using 0.1 mol or more and less than 1 mol of a nitrogen-containing compound having the following general formula (4):

(4)

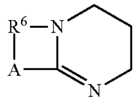

(hereinafter, referred to as "nitrogen-containing compound (4)") per 1 mol of the halogen atom in the haloalkyl organoxysilane compound (2), and liquefying, in the presence of a solvent, a mixture of a hydrogen halide salt of the amine compound (1) and a hydrogen halide salt of the nitrogen-containing compound (4) that are generated in the reaction system to separate the mixture from the nitrogen-containing organoxysilane compound (3) and removing the mixture of the hydrogen halide salts.

In the general formula (1), $R^1$ and $R^2$ each independently represent a hydrogen atom or a monovalent hydrocarbon group having 1 to 10, preferably 2 to 9, and more preferably 2 to 5 carbon atoms. The monovalent hydrocarbon group may include an oxygen, nitrogen, sulfur, or silicon atom, and a case where both $R^1$ and $R^2$ are a hydrogen atom is excluded.

The monovalent hydrocarbon groups as $R^1$ and $R^2$ may be linear, branched, or cyclic, and specific examples of the monovalent hydrocarbon groups include: linear alkyl groups such as methyl, ethyl, n-propyl, n-butyl, n-pentyl, n-hexyl, n-heptyl, n-octyl, and decyl groups; branched alkyl groups such as isopropyl, isobutyl, sec-butyl, tert-butyl, neopentyl, thexyl, and 2-ethylhexyl groups; cyclic alkyl groups such as cyclopentyl and cyclohexyl groups; alkenyl groups such as vinyl, allyl(2-propenyl), 1-propenyl, butenyl, pentenyl, and octenyl groups; aryl groups such as phenyl and tolyl groups; and aralkyl groups such as benzyl and phenethyl groups.

Some or all of the hydrogen atoms in these monovalent hydrocarbon groups may be substituted with an alkyl group having 1 to 3 carbon atoms, such as a methyl group, an ethyl group, or a propyl group.

The monovalent hydrocarbon groups as $R^1$ and $R^2$ may include an oxygen, nitrogen, sulfur, or silicon atom.

Specific examples of such monovalent hydrocarbon groups include: oxyalkyl groups such as hydroxyethyl, methoxyethyl, ethoxyethyl, and methoxypropyl groups; thioalkyl groups such as mercaptoethyl, mercaptopropyl, methylthioethyl, and methylthiopropyl groups; aminoalkyl groups such as aminoethyl and aminopropyl groups; alkyl groups having a cyclic amino moiety, such as 2,2,6,6-tetramethylpiperidyl and 1,2,2,6,6-pentamethylpiperidyl groups; and alkoxysilylalkyl groups such as trimethoxysilylmethyl, trimethoxysilylpropyl, trimethoxysilyloctyl, triethoxysilylmethyl, triethoxysilylpropyl, triethoxysilyloctyl, methyldimethoxysilylpropyl, and dimethylmethoxysilylpropyl groups.

$R^1$ and $R^2$ may form a ring together with a nitrogen atom to which $R^1$ and $R^2$ are each bonded to form a ring structure having the following general formula (5).

(5)

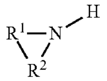

In the general formula (5), the number of carbon atoms included in the ring formed by $R^1$ and $R^2$ is preferably 3 to 6.

Examples of such a ring structure include a piperidine ring, a pyrrolidine ring, a piperazine ring, a methylpiperazine ring, and a morpholine ring.

Specific examples of the amine compound (1) include: primary amine compounds such as methylamine, ethylamine, propylamine, butylamine, hexylamine, octylamine, decylamine, isopropylamine, isobutylamine, sec-butylamine, tert-butylamine, cyclohexylamine, aniline, allylamine, hexenylamine, octenylamine, 4-amino-2,2,6,6-tetramethylpiperidine, 4-amino-1,2,2,6,6-pentamethylpiperidine, trimethoxysilylpropylamine, triethoxysilylpropylamine, methyldimethoxysilylpropylamine, methyldiethoxysilylpropylamine, N-trimethoxysilylpropyl-ethylenediamine, N-triethoxysilylpropyl-ethylenediamine, N-ethylethylenediamine, and N-aminoethylpiperazine; secondary amine compounds such as dimethylamine, diethylamine, dibutylamine, dihexylamine, and dioctylamine; and cyclic secondary amine compounds such as piperidine, pyrrolidine, piperazine, methylpiperazine, and morpholine.

In the general formula (2), $R^3$ represents an unsubstituted divalent hydrocarbon group having 1 to 8, preferably 1 to 5, and more preferably 1 to 3 carbon atoms.

The divalent hydrocarbon group as $R^3$ may be linear, branched, or cyclic, and specific examples of the divalent hydrocarbon group include: linear alkylene groups such as methylene, ethylene, trimethylene, tetramethylene, hexamethylene, and octamethylene groups; branched alkylene groups such as methylethylene (propylene) and methyltrimethylene; cyclic alkylene groups such as cyclohexylene and methylenecyclohexylenemethylene; linear alkenylene groups such as propenylene, butenylene, hexenylene, and octenylene; branched alkenylene groups such as isopropenylene and isobutenylene groups; arylene groups such as phenylene; and aralkylene groups such as methylenephenylene and methylenephenylenemethylene.

Among the divalent hydrocarbon groups, the linear alkylene groups are preferable, and the linear alkylene groups having 1 to 3 carbon atoms are more preferable, from the viewpoint of availability of a raw material.

$R^4$ and $R^5$ represent an unsubstituted monovalent hydrocarbon group having 1 to 6, and preferably 1 to 3 carbon atoms.

The monovalent hydrocarbon groups as $R^4$ and $R^5$ may be linear, branched, or cyclic, and specific examples of the monovalent hydrocarbon groups include: linear alkyl groups such as methyl, ethyl, n-propyl, n-butyl, n-pentyl, and n-hexyl groups; branched alkyl groups such as isopropyl, isobutyl, sec-butyl, tert-butyl, neopentyl, and thexyl groups; cyclic alkyl groups such as cyclopentyl and cyclohexyl groups; alkenyl groups such as vinyl, allyl, propenyl, butenyl, and pentenyl groups; and aryl groups such as a phenyl group.

X is a halogen atom selected from a chlorine atom, a bromine atom, and an iodine atom, and m is an integer of 0, 1, or 2.

Specific examples of the haloalkyl organoxysilane compound (2) include: chloroalkyl alkoxysilane compounds such as chloropropyltrimethoxysilane, chloropropylmethyldimethoxysilane, chloropropyldimethylmethoxysilane, chloropropyltriethoxysilane, chloropropylmethyldiethoxysilane, chloropropyldimethylethoxysilane, chloromethyltrimethoxysilane, chloromethylmethyldimethoxysilane, chloromethyldimethylmethoxysilane, chloromethyltriethoxysilane, chloromethylmethyldiethoxysilane, chloromethyldimethylethoxysilane, chlorooctyltrimethoxysilane, chlorooctylmethyldimethoxysilane, chlorooctyldimethylmethoxysilane, chlorooctyltriethoxysilane, chlorooctylmethyldiethoxysilane, and chlorooctyldimethylethoxysilane; bromoalkylalkoxysilane compounds such as bromopropyltrimethoxysilane, bromopropylmethyldimethoxysilane, bromopropyldimethylmethoxysilane, bromopropyltriethoxysilane, bromopropylmethyldiethoxysilane, and bromopropyldimethylethoxysilane; and iodoalkylalkoxysilane compounds such as iodopropyltrimethoxysilane, iodopropylmethyldimethoxysilane, iodopropyldimethylmethoxysilane, iodopropyltriethoxysilane, iodopropylmethyldiethoxysilane, and iodopropyldimethylethoxysilane.

In the general formula (4), $R^6$ represents an unsubstituted divalent hydrocarbon group having 2 to 5 carbon atoms, and A represents a single bond, —NH—, or —$NCH_3$—.

The divalent hydrocarbon group as $R^6$ may be linear, branched, or cyclic, and specific examples of the divalent hydrocarbon group include: linear alkylene groups such as methylene, ethylene, trimethylene, and tetramethylene groups; branched alkylene groups such as methylethylene and methyltrimethylene groups; cyclic alkylene groups such as cyclopropylene, cyclobutylene, and cyclopentylene groups; linear alkenylene groups such as propenylene, butenylene, and pentenylene; and branched alkenylene groups such as isopropenylene and isobutenylene groups.

Among the divalent hydrocarbon groups, the linear alkylene groups are preferable from the viewpoint of availability of a raw material.

Specific examples of the nitrogen-containing compound (4) include DBU, 1,5-diazabicyclo-[4,3,0]nona-5-ene (hereinafter, referred to as "DBN"), 1,5,7-triazabicyclo[4,4,0]dec-5-ene (TBD), and 7-methyl-1,5,7-triazabicyclo[4,4,0]dec-5-ene (MTBD).

In the present invention, the amount of the nitrogen-containing compound (4) used is 0.1 mol or more and less than 1 mol, preferably 0.5 mol or more and less than 1 mol, and more preferably 0.6 to 0.8 mol per 1 mol of the halogen atom included in the haloalkyl organoxysilane compound (2). If the amount is less than 0.1 mol, the solubility of the hydrogen halide salt in a solvent deteriorates, and if the amount is 1 mol or more, the nitrogen-containing compound (4) remains, and the nitrogen-containing organoxysilane compound (3) as a target product is difficult to isolate at a high purity.

In performing the method for producing of the present invention, the nitrogen-containing compound (4) may be compounded simultaneously with the amine compound (1) and the haloalkyl organoxysilane compound (2), or may be compounded with the nitrogen-containing organoxysilane compound (3) obtained after the reaction between the amine compound (1) and the haloalkyl organoxysilane compound (2).

In the method for producing the nitrogen-containing organoxysilane compound (3) of the present invention, a solvent is used to dissolve a mixture of a hydrogen halide salt of the amine compound (1) and a hydrogen halide salt of the nitrogen-containing compound (4) that are generated by the reaction.

Examples of the solvent to be used include: protic polar solvents such as alcohol compounds such as methanol, ethanol, propanol, isopropanol, and butanol and liquid ammonia; and aprotic polar solvents such as acetonitrile, acetone, dimethoxyethane, dimethylformamide (DMF), ethyl acetate, butyl acetate, dimethyl sulfoxide (DMSO), tetrahydrofuran, and propylene carbonate. These solvents may be used singly or in combination of two or more kinds thereof.

The alcohol compounds are preferable, and methanol and ethanol are more preferable particularly from the viewpoint of high solubility of the mixture of the hydrogen halide salt of the amine compound (1) and the hydrogen halide salt of the nitrogen-containing compound (4) that are generated by the reaction and the viewpoint of ease of handling of the resulting liquid product.

The amount of the solvent used is not particularly limited, and is preferably 5 to 200 g, and more preferably 10 to 100 g per 1 mol of the halogen atom included in the haloalkyl organoxysilane compound (2).

In combination with the solvent, an aromatic hydrocarbon compound may be used such as an (iso)paraffin compound such as hexane, octane, isooctane, decane, dodecane, or isododecane, toluene, or xylene.

Use of these compounds reduces the polarity of the layer including the nitrogen-containing organoxysilane compound (3), and facilitates separation of the layer from the layer in which the mixture of the hydrogen halide salt of the amine compound (1) and the hydrogen halide salt of the nitrogen-containing compound (4) is dissolved.

In the method for producing of the present invention, the compounding ratio of the amine compound (1) and that of the haloalkyl organoxysilane compound (2) are not particularly limited, and the amount of the amine compound (1) is preferably 1 to 10 mol, more preferably 1 to 7 mol, and still more preferably 1.4 to 5 mol per 1 mol of the halogen atom included in the haloalkyl organoxysilane compound (2).

The reaction temperature in the above-described reaction is not particularly limited, and is preferably 70 to 200° C., and more preferably 100 to 150° C.

The reaction time is also not particularly limited, and is preferably 1 to 40 hours, and more preferably 1 to 20 hours.

The reaction is preferably performed under an atmosphere of an inert gas such as nitrogen or argon in order to prevent hydrolysis of the haloalkyl organoxysilane compound (2) and the nitrogen-containing organoxysilane compound (3).

Although the reaction proceeds without a solvent, a solvent can be used.

Examples of the solvent to be used here include the solvents to be used for dissolving the mixture of the hydrogen halide salt of the amine compound (1) and the hydrogen halide salt of the nitrogen-containing compound (4) that are generated by the reaction. These solvents may be used singly or in combination of two or more kinds thereof, and may be used during the reaction or added after the reaction.

Although the reaction proceeds without a catalyst, use of a catalyst can reduce the reaction time.

Specific examples of the catalyst include: tetraalkylammonium salts such as tetramethylammonium bromide, tetraethylammonium bromide, tetrapropylammonium bromide, tetrabutylammonium bromide, and tetrabutylammonium iodide; and tetraalkylphosphonium salts such as tetramethylphosphonium bromide, tetraethylphosphonium bromide, tetrapropylphosphonium bromide, tetrabutylphosphonium bromide, tetrabutylphosphonium iodide, and tributylmethylphosphonium iodide.

The compounding amount of the catalyst is not particularly limited, and is preferably 0.001 to 0.1 mol, and more preferably 0.005 to 0.1 mol per 1 mol of the halogen atom included in the haloalkyl organoxysilane compound (2) from the viewpoint of the effect or the side reaction of adding the catalyst.

Specific examples of the nitrogen-containing organoxysilane compound (3) obtained by a series of reactions described above include methylaminopropyltrimethoxysilane, butylaminopropyltrimethoxysilane, hexyl aminopropyltrimethoxysilane, octylaminopropyltrimethoxysilane, decylaminopropyltrimethoxysilane, cyclohexylaminopropyltrimethoxysilane, phenyl aminopropyltrimethoxysilane, allylaminopropyltrimethoxysilane, octenylaminopropyltrimethoxysilane, (2,2,6,6-tetramethylpiperidyl)aminopropyltrimethoxysilane, bis(trimethoxysilylpropyl)amine, diethylaminopropyltrimethoxysilane, dibutylaminopropyltrimethoxysilane, methylpiperazinopropyltrimethoxysilane, morpholinopropyltrimethoxysilane, tris(trimethoxysilylpropyl)amine, N-ethyl-N,N',N'-tris (trimethoxysilylpropyl)ethylenediamine, N,N,N',N'-tetrakis (trimethoxysilylpropyl)ethylenediamine, N,N,N'-tris (trimethoxysilylpropyl)aminoethylpiperazine, butylaminomethyltrimethoxysilane, cyclohexylaminomethyltrimethoxysilane, phenylaminomethyltrimethoxysilane, bis(trimethoxysilylmethyl)amine, morpholinomethyltrimethoxysilane, butylaminooctyltrimethoxysilane, cyclohexylaminooctyltrimethoxysilane, phenylaminooctyltrimethoxysilane, bis(trimethoxysilyloctyl)amine, morpholinooctyltrimethoxysilane, butylaminopropylmethyldimethoxysilane, cyclohexylaminopropylmethyldimethoxysilane, phenylaminopropylmethyldimethoxysilane, allylaminopropylmethyldimethoxysilane, (2,2,6,6-tetramethylpiperidyl) aminopropylmethyldimethoxysilane, diethylaminopropylmethyldimethoxysilane, dibutylaminopropylmethyldimethoxysilane, methylpiperazinopropylmethyldimethoxysilane, morpholinopropylmethyldimethoxysilane, butylaminopropyldimethylmethoxysilane, cyclohexylaminopropyldimethylmethoxysilane, phenylaminopropyldimethylmethoxysilane, allylaminopropyldimethylmethoxysilane, (2,2,6,6-tetramethylpiperidyl) aminopropyldimethylmethoxysilane, diethylaminopropyldimethylmethoxysilane, dibutylaminopropyldimethylmethoxysilane, methylpiperazinopropyldimethylmethoxysilane, morpholinopropyldimethylmethoxysilane, butylaminopropyltriethoxysilane, cyclohexylaminopropyltriethoxysilane, phenylaminopropyltriethoxysilane, allylaminopropyltriethoxysilane, (2,2,6,6-tetramethylpiperidyl)aminopropyltriethoxysilane, diethylaminopropyltriethoxysilane, dibutylaminopropyltriethoxysilane, methylpiperazinopropyltriethoxysilane, morpholinopropyltriethoxysilane, butylaminopropylmethyldiethoxysilane, cyclohexylaminopropylmethyldiethoxysilane, phenylaminopropylmethyldiethoxysilane, allylaminopropylmethyldiethoxysilane, (2,2,6,6-tetramethylpiperidyl) aminopropylmethyldiethoxysilane, diethylaminopropylmethyldiethoxysilane, dibutylaminopropylmethyldiethoxysilane, methylpiperazinopropylmethyldiethoxysilane, morpholinopropylmethyldiethoxysilane, butylaminopropyldimethylethoxysilane, cyclohexylaminopropyldimethylethoxysilane, phenylaminopropyldimethylethoxysilane, allylaminopropyldimethylethoxysilane, (2,2,6,6-tetramethylpiperidyl)aminopropyldimethylethoxysilane, diethylaminopropyldimethylethoxysilane, dibutylaminopropyldimethylethoxysilane, methylpiperazinopropyldimethylethoxysilane, and morpholinopropyldimethylethoxysilane.

As a result of the series of reactions described above, a mixture is obtained that contains the nitrogen-containing organoxysilane compound (3), the hydrogen halide salt of the amine compound (1), the hydrogen halide salt of the nitrogen-containing compound (4), and the solvent. The mixture sometimes further contains the amine compound (1) used excessively. The mixture is separated into a layer including the nitrogen-containing organoxysilane compound (3) and a layer in which the hydrogen halide salt of the amine compound (1) and the hydrogen halide salt of the nitrogen-containing compound (4) are dissolved in the solvent, and in many cases, the former layer is an upper layer, and the latter layer is a lower layer. The lower layer is removed, and thus the hydrogen halide salt of the amine compound (1) and the hydrogen halide salt of the nitrogen-containing compound (4) can be removed. In order to dissolve the hydrogen halide salts in the solvent reliably, for example, the mixture may be heated to 50° C. or higher when the lower layer is removed.

The nitrogen-containing organoxysilane compound (3) as a target product can be isolated and purified with a method appropriately selected from purification methods in normal organic synthesis, such as stripping under reduced pressure, various kinds of chromatography, treatment using an adsorbent, filtration, and distillation. Distillation is particularly preferable from the viewpoint of ease of scale-up.

EXAMPLES

Hereinafter, the present invention is more specifically described with reference to Examples and Comparative Examples, but the present invention is not limited to the following Examples.

Example 1

Synthesis of Morpholinopropylmethyldimethoxysilane

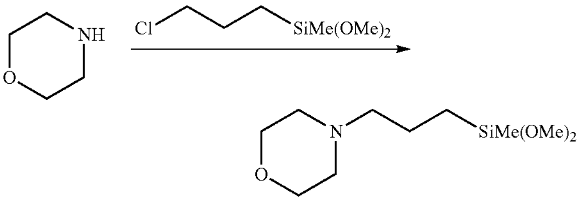

In the formula, Me represents a methyl group. The same applies hereinafter.

The inner atmosphere of a four-necked glass flask equipped with a stirrer, a thermometer, and a reflux condenser was replaced with nitrogen, 122.1 g (1.402 mol) of morpholine, 19.8 g of methanol, and 91.6 g (0.602 mol, 0.603 mol per 1 mol of the chlorine atom in chloropropylmethyldimethoxysilane) of DBU were put into the four-necked glass flask, and the resulting mixture was heated to 80° C. To the mixture, 182.4 g (0.998 mol) of chloropropylmethyldimethoxysilane was added dropwise over 3.5 hours, and the resulting mixture was stirred at 110° C. for 3 hours. At this time, the reaction solution was separated into two layers. The upper layer was analyzed with gas chromatography (hereinafter, referred to as "GC"), and as a result, morpholinopropylmethyldimethoxysilane was confirmed to be generated. DBU was not detected.

The lower layer was removed at 80° C., and the upper layer was distilled. As a fraction at 105° C./0.2 kPa, 164.8 g (yield: 71%) of morpholinopropylmethyldimethoxysilane was obtained. The fraction was free of DBU.

Example 2

Synthesis of Morpholinopropylmethyldimethoxysilane

The inner atmosphere of a four-necked glass flask equipped with a stirrer, a thermometer, and a reflux condenser was replaced with nitrogen, 261.3 g (3.000 mol) of morpholine, 40.0 g of methanol, and 182.6 g (1.200 mol, 0.600 mol per 1 mol of the chlorine atom in chloropropylmethyldimethoxysilane) of DBU were put into the four-necked glass flask, and the resulting mixture was heated to 90° C. To the mixture, 365.4 g (2.000 mol) of chloropropylmethyldimethoxysilane was added dropwise over 2 hours, and the resulting mixture was stirred at 110° C. for 4 hours. At this time, the reaction solution was separated into two layers. The upper layer was analyzed with GC, and as a result, morpholinopropylmethyldimethoxysilane was confirmed to be generated. DBU was not detected.

The lower layer was removed at 80° C., and the upper layer was distilled. As a fraction at 105° C./0.2 kPa, 375.0 g (yield: 80%) of morpholinopropylmethyldimethoxysilane was obtained. The fraction was free of DBU.

Example 3

A reaction was performed in the same manner as in Example 1, except that 104.5 g (1.200 mol) of morpholine and 121.7 g (0.800 mol, 0.800 mol per 1 mol of the halogen atom in chloropropylmethyldimethoxysilane) of DBU were used. At the end of the reaction, the reaction solution was separated into two layers. The upper layer was analyzed with GC, and as a result, morpholinopropylmethyldimethoxysilane was confirmed to be generated. DBU was not detected.

Example 4

A reaction was performed in the same manner as in Example 1, except that 130.6 g (1.500 mol) of morpholine and 76.1 g (0.500 mol, 0.500 mol per 1 mol of the halogen atom in chloropropylmethyldimethoxysilane) of DBU were used. At the end of the reaction, the reaction solution was separated into two layers. The upper layer was analyzed with GC, and as a result, morpholinopropylmethyldimethoxysilane was confirmed to be generated. DBU was not detected.

Example 5

A reaction was performed in the same manner as in Example 1, except that 139.4 g (1.600 mol) of morpholine and 61.0 g (0.401 mol, 0.401 mol per 1 mol of the halogen atom in chloropropylmethyldimethoxysilane) of DBU were used. At the end of the reaction, the reaction solution was separated into two layers. The upper layer was analyzed with GC, and as a result, morpholinopropylmethyldimethoxysilane was confirmed to be generated. DBU was not detected.

Example 6

A reaction was performed in the same manner as in Example 1, except that 19.8 g of methanol was changed to 39.6 g of methanol. At the end of the reaction, the reaction solution was separated into two layers. The upper layer was analyzed with GC, and as a result, morpholinopropylmethyldimethoxysilane was confirmed to be generated. DBU was not detected.

Example 7

A reaction was performed in the same manner as in Example 1, except that 19.8 g of methanol was changed to 39 g of acetonitrile. At the end of the reaction, the reaction solution was separated into two layers. The upper layer was analyzed with GC, and as a result, morpholinopropylmethyldimethoxysilane was confirmed to be generated. DBU was not detected.

Example 8

A reaction was performed in the same manner as in Example 1, except that 19.8 g of methanol was changed to 45 g of ethyl acetate. At the end of the reaction, the reaction solution was separated into two layers. The upper layer was analyzed with GC, and as a result, morpholinopropylmethyldimethoxysilane was confirmed to be generated. DBU was not detected.

Example 9

A reaction was performed in the same manner as in Example 1, except that 19.8 g of methanol was changed to 47.2 g of dimethylformamide. At the end of the reaction, the reaction solution was separated into two layers. The upper layer was analyzed with GC, and as a result, morpholinopropylmethyldimethoxysilane was confirmed to be generated. DBU was not detected.

Example 10

A reaction was performed in the same manner as in Example 1, except that 33.3 g of hexane was used in addition to 19.8 g of methanol. At the end of the reaction, the reaction solution was separated into two layers. The upper layer was analyzed with GC, and as a result, morpholinopropylmethyldimethoxysilane was confirmed to be generated. DBU was not detected.

Example 11

A reaction was performed in the same manner as in Example 1, except that 43.5 g of toluene was used in addition to 19.8 g of methanol. At the end of the reaction, the reaction solution was separated into two layers. The upper layer was analyzed with GC, and as a result, morpholinopropylmethyldimethoxysilane was confirmed to be generated. DBU was not detected.

Example 12

Synthesis of Morpholinopropyltrimethoxysilane

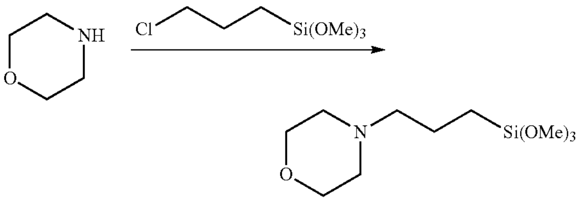

The inner atmosphere of a four-necked glass flask equipped with a stirrer, a thermometer, and a reflux condenser was replaced with nitrogen, 488.3 g (5.606 mol) of morpholine, 79.2 g of methanol, and 365.0 g (2.398 mol, 0.600 mol per 1 mol of the chlorine atom in chloropropyltrimethoxysilane) of DBU were put into the four-necked glass flask, and the resulting mixture was heated to 80° C. To the mixture, 794.1 g (3.996 mol) of chloropropyltrimethoxysilane was added dropwise over 6 hours, and the resulting mixture was stirred at 110° C. for 1.5 hours. At this time, the reaction solution was separated into two layers. The upper layer was analyzed with GC, and as a result, morpholinopropyltrimethoxysilane was confirmed to be generated. DBU was not detected.

The lower layer was removed at 80° C., and the upper layer was distilled. As a fraction at 105° C./0.2 kPa, 735.9 g (yield: 74%) of morpholinopropyltrimethoxysilane was obtained. The fraction was free of DBU.

Example 13

Synthesis of Morpholinopropylmethyldiethoxysilane

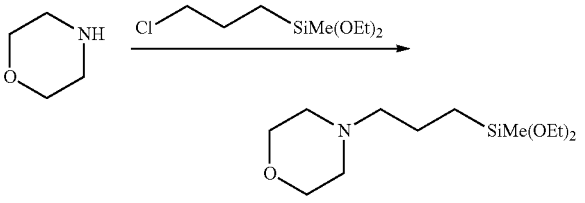

In the formula, Et represents an ethyl group. The same applies hereinafter.

The inner atmosphere of a four-necked glass flask equipped with a stirrer, a thermometer, and a reflux condenser was replaced with nitrogen, 261.3 g (3.000 mol) of morpholine, 92.2 g of ethanol, and 182.6 g (1.200 mol, 0.600 mol per 1 mol of the chlorine atom in chloropropylmethyldiethoxysilane) of DBU were put into the four-necked glass flask, and the resulting mixture was heated to 90° C. To the mixture, 421.6 g (2.000 mol) of chloropropylmethyldiethoxysilane was added dropwise over 2 hours, and the resulting mixture was stirred at 110° C. for 4 hours. At this time, the reaction solution was separated into two layers. The upper layer was analyzed with GC, and as a result, morpholinopropylmethyldiethoxysilane was confirmed to be generated. DBU was not detected.

The lower layer was removed at 80° C., and the upper layer was distilled. As a fraction at 118° C./0.4 kPa, 432.1 g (yield: 83%) of morpholinopropylmethyldiethoxysilane was obtained. The fraction was free of DBU.

Example 14

Synthesis of Morpholinopropyltriethoxysilane

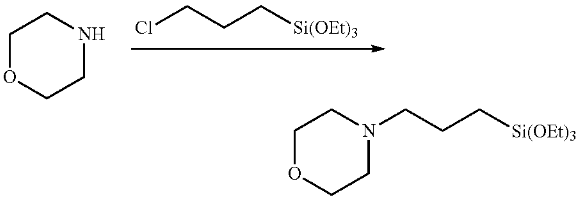

The inner atmosphere of a four-necked glass flask equipped with a stirrer, a thermometer, and a reflux condenser was replaced with nitrogen, 261.3 g (3.000 mol) of morpholine, 92.2 g of ethanol, and 182.6 g (1.200 mol, 0.600 mol per 1 mol of the chlorine atom in chloropropyltriethoxysilane) of DBU were put into the four-necked glass flask, and the resulting mixture was heated to 90° C. To the mixture, 481.6 g (2.000 mol) of chloropropyltriethoxysilane was added dropwise over 2 hours, and the resulting mixture was stirred at 110° C. for 6 hours. At this time, the reaction solution was separated into two layers. The upper layer was analyzed with GC, and as a result, morpholinopropylltriethoxysilane was confirmed to be generated. DBU was not detected.

The lower layer was removed at 80° C., and the upper layer was distilled. As a fraction at 125° C./0.4 kPa, 469.6 g (yield: 81%) of morpholinopropyltriethoxysilane was obtained. The fraction was free of DBU.

Example 15

Synthesis of Methylpiperazinopropyltrimethoxysilane

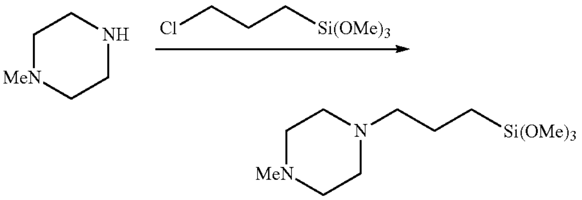

The inner atmosphere of a four-necked glass flask equipped with a stirrer, a thermometer, and a reflux condenser was replaced with nitrogen, 140.2 g (1.399 mol) of methylpiperazine, 19.8 g of methanol, and 91.3 g (0.600 mol, 0.600 mol per 1 mol of the chlorine atom in chloropropyltrimethoxysilane) of DBU were put into the four-necked glass flask, and the resulting mixture was heated to 80° C. To the mixture, 198.5 g (1.000 mol) of chloropropyltrimethoxysilane was added dropwise over 2.5 hours, and the resulting mixture was stirred at 110° C. for 4 hours. At this time, the reaction solution was separated into two layers. The upper layer was analyzed with GC, and as a result, methylpiperazinopropyltrimethoxysilane was confirmed to be generated. DBU was not detected.

The lower layer was removed at 80° C., and the upper layer was distilled. As a fraction at 119° C./0.2 kPa, 193.9 g (yield: 74%) of methylpiperazinopropyltrimethoxysilane was obtained. The fraction was free of DBU.

Example 16

Synthesis of Morpholinooctyltrimethoxysilane

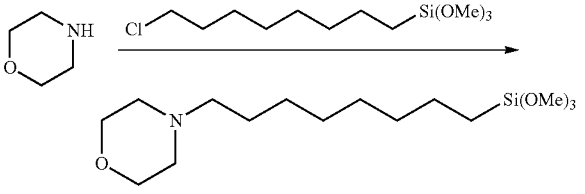

The inner atmosphere of a four-necked glass flask equipped with a stirrer, a thermometer, and a reflux condenser was replaced with nitrogen, 13.1 g (0.150 mol) of morpholine, 2.3 g of methanol, and 9.2 g (0.060 mol, 0.600 mol per 1 mol of the chlorine atom in chlorooctyltrimethoxysilane) of DBU were put into the four-necked glass flask, and the resulting mixture was heated to 80° C. To the mixture, 26.9 g (0.100 mol) of chlorooctyltrimethoxysilane was added dropwise over 2.5 hours, and the resulting mixture was stirred at 110° C. for 4 hours. At this time, the reaction solution was separated into two layers. The upper layer was analyzed with GC, and as a result, morpholinooctyltrimethoxysilane was confirmed to be generated. DBU was not detected.

The lower layer was removed at 80° C., and the upper layer was distilled. As a fraction at 158° C./0.2 kPa, 16.3 g (yield: 51%) of morpholinooctyltrimethoxysilane was obtained. The fraction was free of DBU.

Example 17

Synthesis of Diethylaminopropylmethyldiethoxysilane

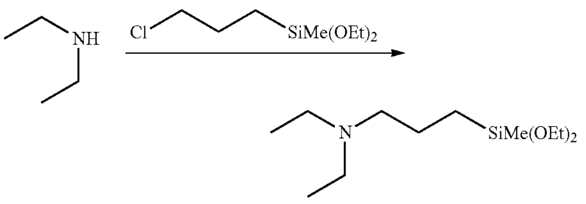

The inner atmosphere of a four-necked glass flask equipped with a stirrer, a thermometer, and a reflux condenser was replaced with nitrogen, 70.2 g (0.960 mol) of diethylamine, 36.9 g of ethanol, and 109.6 g (0.7201 mol, 0.900 mol per 1 mol of the chlorine atom in chloropropylmethyldiethoxysilane) of DBU were put into the four-necked glass flask, and the resulting mixture was heated to 70° C. To the mixture, 168.6 g (0.7998 mol) of chloropropylmethyldiethoxysilane was added dropwise over 1 hour, and the resulting mixture was stirred under reflux for 18 hours. At this time, the reaction solution was separated into two layers. The upper layer was analyzed with GC, and as a result, DBU was not detected.

The lower layer was removed at 80° C., and the upper layer was distilled. As a fraction at 90° C./0.4 kPa, 114.1 g (yield: 58%) of diethylaminopropylmethyldiethoxysilane was obtained. The fraction was free of DBU.

Example 18

Synthesis of Diethylaminoethylaminopropylmethyldimethoxysilane

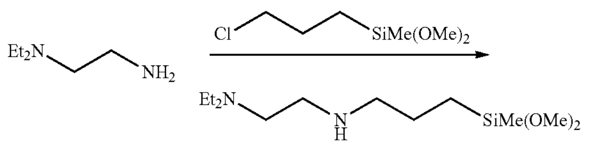

The inner atmosphere of a four-necked glass flask equipped with a stirrer, a thermometer, and a reflux condenser was replaced with nitrogen, 69.7 g (0.600 mol) of diethylaminoethylenediamine, 4.6 g of methanol, and 18.3 g (0.120 mol, 0.600 mol per 1 mol of the chlorine atom in chloropropylmethyldimethoxysilane) of DBU were put into the four-necked glass flask, and the resulting mixture was heated to 80° C. To the mixture, 36.5 g (0.200 mol) of chloropropylmethyldimethoxysilane was added dropwise over 2.5 hours, and the resulting mixture was stirred at 110° C. for 4 hours. At this time, the reaction solution was separated into two layers. The upper layer was analyzed with GC, and as a result, diethylaminoethylaminopropylmethyldimethoxysilane was confirmed to be generated. DBU was not detected.

The lower layer was removed at 80° C., and the upper layer was distilled. As a fraction at 110° C./0.5 kPa, 23.5 g (yield: 45%) of diethylaminoethylaminopropylmethyldimethoxysilane was obtained. The fraction was free of DBU.

Example 19

Synthesis of 3-(2,2,6,6-tetramethylpiperidinyl)aminopropyltrimethoxysilane

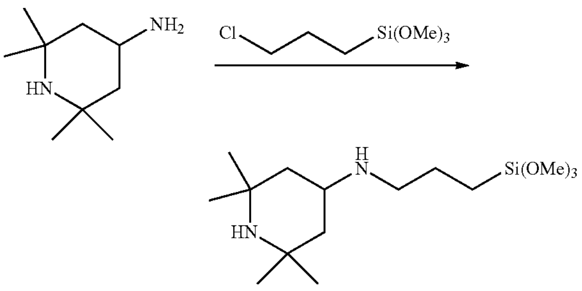

The inner atmosphere of a four-necked glass flask equipped with a stirrer, a thermometer, and a reflux condenser was replaced with nitrogen, 500 g (3.20 mol) of 4-amino-2,2,6,6-tetramethylpiperidine, and 2.8 g (0.0084 mol) of tetrabutylphosphonium bromide were put into the four-necked glass flask, and the resulting mixture was heated to 120° C. To the mixture, 159 g (0.800 mol) of chloropropyltrimethoxysilane was added dropwise over 2 hours, and the resulting mixture was stirred at the constant temperature for 8 hours. To the resulting reaction solution, 18.4 g of methanol, 92.0 g of isooctane, and 59.6 g (0.480 mol, 0.600 mol per 1 mol of the chlorine atom in chloropropyltrimethoxysilane) of DBN were added, and the resulting solution was stirred at 80° C. for 1 hour. At this time, the reaction solution was separated into two layers. The upper layer was analyzed with GC, and as a result, DBN was not detected.

The lower layer was removed at 80° C., and the upper layer was distilled. As a fraction at 150° C./0.5 kPa, 238.8 g (yield: 75%) of 3-(2,2,6,6-tetramethylpiperidinyl)aminopropyltrimethoxysilane was obtained. The fraction was free of DBN.

Example 20

Synthesis of Bis(3-triethoxysilylpropyl)amine

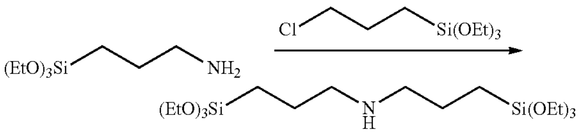

The inner atmosphere of a four-necked glass flask equipped with a stirrer, a thermometer, and a reflux condenser was replaced with nitrogen, 106.3 g (0.4801 mol) of 3-aminopropyltriethoxysilane, 6.6 g of ethanol, and 18.3 g (0.120 mol, 0.600 mol per 1 mol of the chlorine atom in chloropropyltriethoxysilane) of DBU were put into the four-necked glass flask, and the resulting mixture was heated to 140° C. To the mixture, 48.2 g (0.200 mol) of chloropropyltriethoxysilane was added dropwise over 1 hour, and the resulting mixture was stirred at the constant temperature for 4 hours. At this time, the reaction solution was separated into two layers. The upper layer was analyzed with GC, and as a result, bis(3-triethoxysilylpropyl)amine was confirmed to be generated. DBU was not detected.

The lower layer was removed at 80° C., and the upper layer was distilled. As a fraction at 146° C./0.4 kPa, 36.6 g (yield: 43%) of bis(3-triethoxysilylpropyl)amine was obtained. The fraction was free of DBU.

Comparative Example 1

Synthesis of 3-Morpholinopropylmethyldimethoxysilane

The inner atmosphere of a four-necked glass flask equipped with a stirrer, a thermometer, and a reflux condenser was replaced with nitrogen, 9.6 g (0.110 mol) of morpholine, 3.9 g of methanol, and 16.8 g (0.110 mol, 1.100 mol per 1 mol of the chlorine atom in chloropropylmethyldimethoxysilane) of DBU were put into the four-necked glass flask, and the resulting mixture was heated to 80° C. To the mixture, 18.2 g (0.100 mol) of chloropropylmethyldimethoxysilane was added dropwise over 3.5 hours, and the resulting mixture was stirred at 110° C. for 3 hours. At this time, the reaction solution was separated into two layers. The upper layer was analyzed with GC, and as a result, DBU was detected.

Distillation and isolation were performed under the same conditions as in Example 1, and as a result, DBU was mixed in the fraction.

From the results of Examples described above, it is found that in the method for producing of the present invention, the amine salt of the hydrogen halide generated by the reaction can be removed with liquid separation operation. At this time, the nitrogen-containing compound used in liquefying the hydrogen halide salt is not included in the layer including the nitrogen-containing organoxysilane compound, and therefore a high-purity nitrogen-containing organoxysilane can be isolated with distillation purification.

Meanwhile, from the results of Comparative Examples, it is found that if the amount of the nitrogen-containing compound used is larger than that of the hydrogen halide generated by the reaction, the nitrogen-containing compound remains in the layer including the nitrogen-containing organoxysilane compound, and the desired nitrogen-containing organoxysilane compound has a low purity.

Japanese Patent Application No. 2020-197919 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for producing a nitrogen-containing organoxysilane compound having a general formula (3) described below:

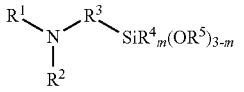

(3)

wherein $R^1$ and $R^2$ each independently represent a hydrogen atom or a monovalent hydrocarbon group having 1 to 10 carbon atoms, the monovalent hydrocarbon group may include an oxygen, nitrogen, sulfur, or silicon atom in some cases, $R^1$ and $R^2$ may be bonded to each other to form a ring together with a nitrogen atom in some cases, and a case where both $R^1$ and $R^2$ are a hydrogen atom is excluded, $R^3$ represents an unsubstituted divalent hydrocarbon group having 1 to 8 carbon atoms, $R^4$ and $R^5$ represent an unsubstituted monovalent hydrocarbon group having 1 to 6 carbon atoms, and m is an integer of 0, 1, or 2, wherein the nitrogen-containing organoxysilane compound having the general formula (3) is selected from:

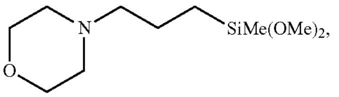

,

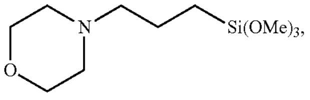

,

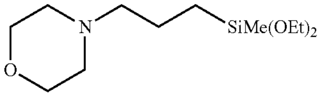

-continued

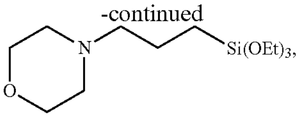

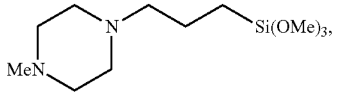

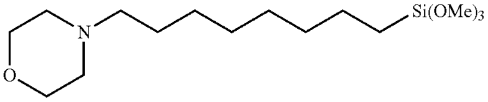

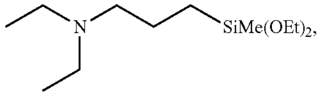

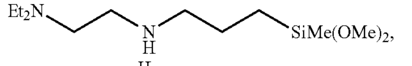

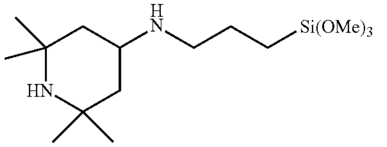

or

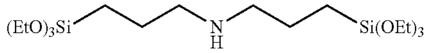

by reacting an amine compound having a general formula (1) described below:

(1)

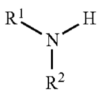

wherein $R^1$ and $R^2$ are as described above, and wherein the amine compound having a general formula (1) is selected from:

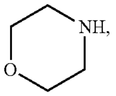

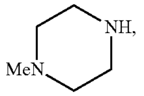

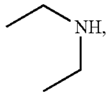

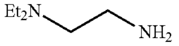

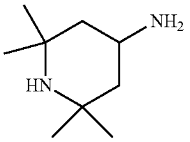

or

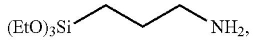

with a haloalkyl organoxysilane compound having a general formula (2) described below:

(2)

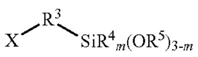

wherein $R^3$ to $R^5$ and m are as described above, and X represents a halogen atom which is a chlorine atom, and wherein the haloalkyl organoxysilane compound having a general formula (2) is selected from:

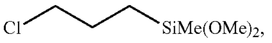

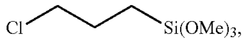

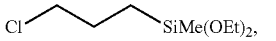

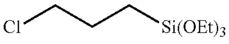

or

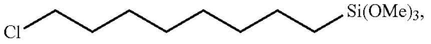

the method comprising the steps of:

using 0.6 mol or more and 0.9 mol or less of a nitrogen-containing compound having a general formula (4) described below per 1 mol of the halogen chlorine atom in the haloalkyl organoxysilane compound having a general formula (2):

(4)

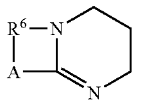

wherein $R^6$ represents an unsubstituted divalent hydrocarbon group having 2 to 5 carbon atoms, and A represents a single bond, —NH—, or —$NCH_3$—;

liquefying, by using a protic polar solvent, a mixture of the hydrogen halide salt of the amine compound having the general formula (1) and the hydrogen halide salt of the nitrogen-containing compound having the general formula (4) that are generated in the reaction system whereby separating the liquefied mixture from the nitrogen-containing organoxysilane compound having the general formula (3) by a liquid separation; and removing the liquefied mixture from the nitrogen-containing organoxysilane compound having the general formula (3), wherein the protic polar solvent is selected from the group consisting of methanol and ethanol.

2. The method for producing a nitrogen-containing organoxysilane compound according to claim 1, wherein 1.4 mol or more of the amine compound having the general formula (1) is used per 1 mol of the halogen atom in the haloalkyl organoxysilane compound having the general formula (2).

3. The method for producing a nitrogen-containing organoxysilane compound according to claim 1, wherein the nitrogen-containing compound having the general formula (4) is 1,8-diazabicyclo[5.4.0]undeca-7-ene or 1,5-diazabicyclo[4.3.0]nona-5-ene.

4. A method for producing a nitrogen-containing organoxysilane compound having a general formula (3) described below:

(3)

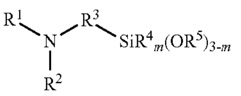

wherein $R^1$ and $R^2$ each independently represent a hydrogen atom or a monovalent hydrocarbon group having 1 to 10 carbon atoms, the monovalent hydrocarbon group may include an oxygen, nitrogen, sulfur, or silicon atom in some cases, $R^1$ and $R^2$ may be bonded to each other to form a ring together with a nitrogen atom in some cases, and a case where both $R^1$ and $R^2$ are a hydrogen atom is excluded, $R^3$ represents an unsubstituted divalent hydrocarbon group having 1 to 8 carbon atoms, $R^4$ and $R^5$ represent an unsubstituted monovalent hydrocarbon group having 1 to 6 carbon atoms, and m is an integer of 0, 1, or 2, wherein the nitrogen-containing organoxysilane compound having the general formula (3) is selected from:

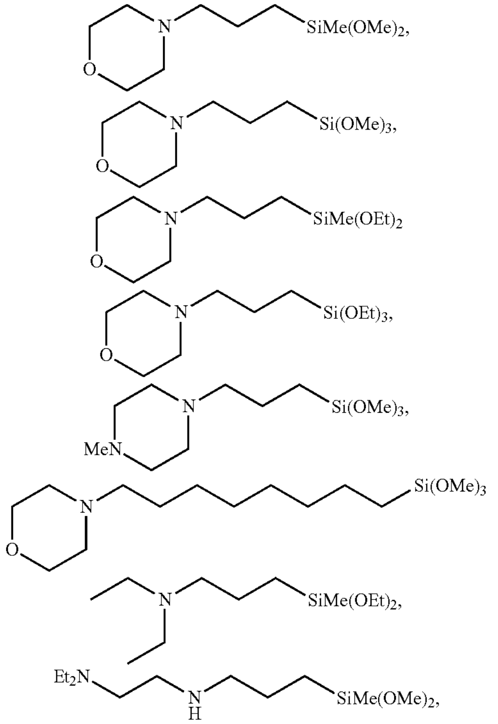

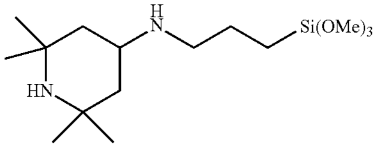

or

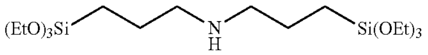

the method comprising the steps of:

reacting an amine compound having a general formula (1) described below:

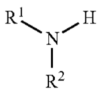

(1)

wherein $R^1$ and $R^2$ are as described above, and wherein the amine compound having a general formula (1) is selected from:

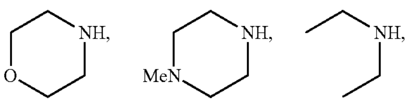

-continued

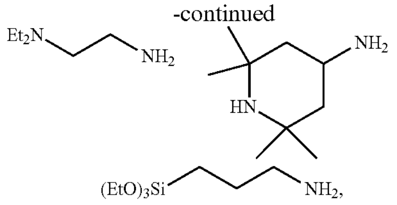

or with a haloalkyl organoxysilane compound having a general formula (2) described below:

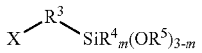

(2)

wherein $R^3$ to $R^5$ and m are as described above, and X represents a halogen atom which is a chlorine atom;

and wherein the haloalkyl organoxysilane compound having a general formula (2) is selected from:

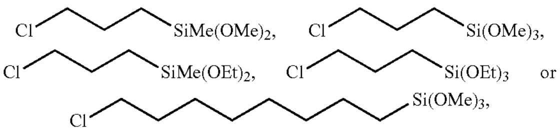

or using 0.6 mol or more and 0.9 mol or less of a nitrogen-containing compound having a general formula (4) described below per 1 mol of the halogen atom in the haloalkyl organoxysilane compound having the general formula (2):

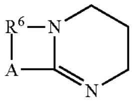

(4)

wherein $R^6$ represents an unsubstituted divalent hydrocarbon group having 2 to 5 carbon atoms, and A represents a single bond, —NH—, or —$NCH_3$—;

liquefying, by using a protic polar solvent, a mixture of the hydrogen halide salt of the amine compound having the general formula (1) and the hydrogen halide salt of the nitrogen-containing compound having the general formula (4) that are generated in the reaction system so as to obtain a reaction solution having two layers, so that one of the two layers contains the nitrogen-containing organoxysilane compound having the general formula (3); and removing the other of the two layers from the reaction solution, whereby separating the nitrogen-containing organoxysilane compound having the general formula (3) from the reaction solution, wherein the protic polar solvent is selected from the group consisting of methanol and ethanol.

* * * * *